(12) United States Patent
Odahara et al.

(10) Patent No.: US 8,760,256 B2
(45) Date of Patent: Jun. 24, 2014

(54) ELECTRONIC COMPONENT AND MANUFACTURING METHOD THEREOF

(71) Applicant: Murata Manufacturing Co., Ltd., Kyoto-fu (JP)

(72) Inventors: Mitsuru Odahara, Kyoto-fu (JP); Hideaki Matsushima, Kyoto-fu (JP); Akihiro Ono, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 13/692,827

(22) Filed: Dec. 3, 2012

(65) Prior Publication Data

US 2013/0088316 A1   Apr. 11, 2013

Related U.S. Application Data

(63) Continuation of application No. PCT/JP2011/056049, filed on Mar. 15, 2011.

(30) Foreign Application Priority Data

Jun. 9, 2010 (JP) ................................ 2010-132062

(51) Int. Cl.
- *H01F 5/00* (2006.01)
- *H01F 27/29* (2006.01)
- *H01F 27/24* (2006.01)
- *H01F 27/28* (2006.01)

(52) U.S. Cl.
USPC ............ 336/200; 336/192; 336/234; 336/232

(58) Field of Classification Search
USPC .................... 336/200, 192, 234, 232
See application file for complete search history.

(56) References Cited

U.S. PATENT DOCUMENTS

| | | | | |
|---|---|---|---|---|
| 6,154,114 | A * | 11/2000 | Takahashi | 336/200 |
| 6,480,083 | B1 * | 11/2002 | Toi et al. | 336/192 |
| 6,535,095 | B2 * | 3/2003 | Aoki et al. | 336/83 |
| 7,078,988 | B2 * | 7/2006 | Suzuki et al. | 333/181 |

(Continued)

FOREIGN PATENT DOCUMENTS

| | | |
|---|---|---|
| JP | S62-031107 A | 2/1987 |
| JP | 62-172101 U | 10/1987 |

(Continued)

OTHER PUBLICATIONS

International Search Report; PCT/JP2011/056049; Jun. 14, 2011.

(Continued)

*Primary Examiner* — Alexander Talpalatski
*Assistant Examiner* — Kazi Hossain
(74) *Attorney, Agent, or Firm* — Studebaker & Brackett PC (57) ABSTRACT

An electronic component that can be prevented from being mounted on a circuit board with inclination, and a manufacturing method thereof are provided. An electronic component is mountable on a circuit board including a first land and a second land. The electronic component includes outer electrodes on a lower surface of a stack to be arranged along a direction and are connectable to the first land and the second land, respectively. With the electronic component mounted to the circuit board, respective contact surfaces of the outer electrodes to the first land and the second land have a structure being symmetric about a line parallel to the direction, and each respective contact surface is divided into a plurality of portions.

14 Claims, 10 Drawing Sheets

(56) References Cited

U.S. PATENT DOCUMENTS

| | | | |
|---|---|---|---|
| 7,256,673 B2 * | 8/2007 | Okumura et al. | 336/83 |
| 2005/0237141 A1 * | 10/2005 | Hirai et al. | 336/83 |
| 2010/0052838 A1 * | 3/2010 | Matsuta et al. | 336/200 |

FOREIGN PATENT DOCUMENTS

| | | | |
|---|---|---|---|
| JP | S62-172101 | U | 10/1987 |
| JP | 05-029173 | A | 2/1993 |
| JP | H05-029173 | A | 2/1993 |
| JP | H08-264329 | A | 10/1996 |
| JP | 11-067554 | A | 3/1999 |
| JP | 2000-232018 | A | 8/2000 |
| JP | 2002-280253 | A | 9/2002 |
| JP | 2004-127966 | A | 4/2004 |
| JP | 2005-322743 | A | 11/2005 |
| JP | 2006-114626 | A | 4/2006 |
| JP | 2007-299839 | A | 11/2007 |
| JP | 2008-198923 | A | 8/2008 |
| JP | 2008-306147 | A | 12/2008 |
| KR | 10-1999-0087995 | A | 12/1999 |

OTHER PUBLICATIONS

Voluntary Amendment to Japanese Utility Model Application No. 61-44930 (JP S62-172101), which was submitted to the Japanese Patent Office on May 28, 1987; with English language description of the amendment to the specification and the drawings.

An Office Action; "Notification of Reasons for Refusal" issued by the Japanese Patent Office dated Oct. 8, 2013, which corresponds to Japanese Patent Application No. 2012-519292 and is related to U.S. Appl. No. 13/692,827; with English translation.

An Office Action; "Notice of Preliminary Rejection," issued by the Korean Patent Office on Dec. 6, 2013, which corresponds to Korean Patent Application No. 10-2012-7032120 and is related to U.S. Appl. No. 13/692,827.

An Office Action "Notification of Reasons for Refusal" issued by the Japanese Patent Office dated Jul. 9, 2013, which corresponds to Japanese Patent Application No. 2012-519292 and is related to U.S. Appl. No. 13/692,827; with translation.

* cited by examiner

ELECTRONIC COMPONENT AND MANUFACTURING METHOD THEREOF

CROSS REFERENCE TO RELATED APPLICATIONS

The present application claims priority to International Application No. PCT/JP2011/056049 filed on Mar. 15, 2011, and to Japanese Patent Application No. 2010-132062 filed on Jun. 9, 2010, the entire contents of each of these applications being incorporated herein by reference in their entirety.

TECHNICAL FIELD

The technical field relates to electronic components and manufacturing methods thereof, and more particularly relates to an electronic component that is mounted on a circuit board and to a manufacturing method thereof.

BACKGROUND

As a conventional electronic component, for example, a laminate coil component described in Japanese Unexamined Patent Application Publication No. 2005-322743 (Patent Document 1) is known. In the laminate coil component, two outer electrodes are provided on a surface (hereinafter, referred to as mount surface) of a ceramic stack. The outer electrodes are not folded to a surface other than the mount surface of the ceramic stack. With the above-described electronic component, since the outer electrodes are provided only on the mount surface, when the electronic component is mounted on the circuit board by soldering, solder does not adhere to a surface other than the mount surface of the ceramic stack. Hence, the solder does not spread from the ceramic stack to around the ceramic stack. As the result, the electronic component can be mounted in a narrow region of the circuit board.

SUMMARY

The present disclosure provides an electronic component that can be prevented from being mounted on a circuit board without inclination and a manufacturing method thereof.

An electronic component according to a first aspect is capable of being mounted on a circuit board including a first land and a second land. The electronic component includes a body; and a first outer electrode and a second outer electrode that are arranged in a predetermined direction on a mount surface of the body, and are connectable to the first land and the second land, respectively. With the first outer electrode and the second outer electrode connected to the first land and the second land, a first contact surface of the first outer electrode to the first land and a second contact surface of the second outer electrode to the second land each have a structure being symmetric about a line parallel to the predetermined direction and each of the first contact surface and the second contact surface is divided into a plurality of portions.

A manufacturing method according to a first aspect of the electronic component includes steps of: stacking a plurality of insulating layers provided with respective inner conductors to obtain the body in which the inner conductors are exposed from the mount surface, a ratio of an area occupied by the inner conductors in part arranged between the plurality of portions of each of the first contact surface and the second contact surface being smaller than a ratio of an area occupied by the inner conductors in each of the first contact surface and the second contact surface; and forming the first outer electrode and the second outer electrode by plating such that the inner conductors exposed from the mount surface are covered with the first outer electrode and the second outer electrode.

A manufacturing method according to a second aspect of the electronic component includes steps of: preparing a plurality of insulating layers; forming the first outer electrode and the second outer electrode on the insulating layers, the first outer electrode and the second outer electrode being formed such that a thickness of part of the first outer electrode and the second outer electrode is smaller than a thickness of the other part of the first outer electrode and the second outer electrode; and a third step of forming the body by stacking the plurality of insulating layers.

A manufacturing method according to a third aspect of the electronic component includes steps of preparing a plurality of insulating layers; forming the first outer electrode and the second outer electrode on the insulating layers, the first outer electrode and the second outer electrode being formed such that the first outer electrode and the second outer electrode are each divided into a plurality of portions; and a third step of forming the body by stacking the plurality of insulating layers.

DETAILED DESCRIPTION

The inventors realized that a electronic component such as described in Patent Document 1 may be susceptible to a problem in that, when mounted on the circuit board, it becomes mounted with inclination. More specifically, the electronic component is mounted on the circuit board by firstly placing the electronic component on the circuit board, secondly liquefying the solder by heating the solder, and thirdly hardening the solder. At this time, since the outer electrodes are provided only on the mount surface, the solder adheres only to the mount surface and do not adhere to a surface other than the mount surface. Hence, the surface area of the solder may become relatively small. Thus, a surface tension of the liquefied solder may become small, and the attraction force on the liquefied solder between the electronic component and the circuit board becomes small. As the result, when the solder is liquefied, the electronic component may be inclined on the circuit board even with a weak impact. That is, the electronic component may be mounted on the circuit board with inclination.

Electronic components and manufacturing methods thereof according to exemplary embodiments, which can address the above problem, are described below.

Figure 1:
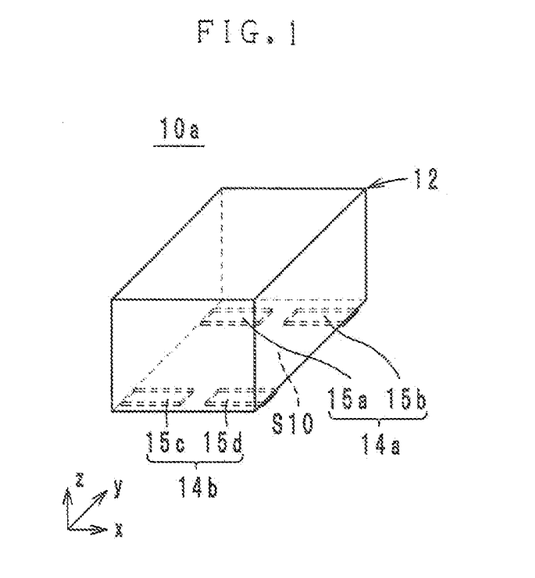
FIG. 1 is an external perspective view of an electronic component according to a first exemplary embodiment.
Figure 2:
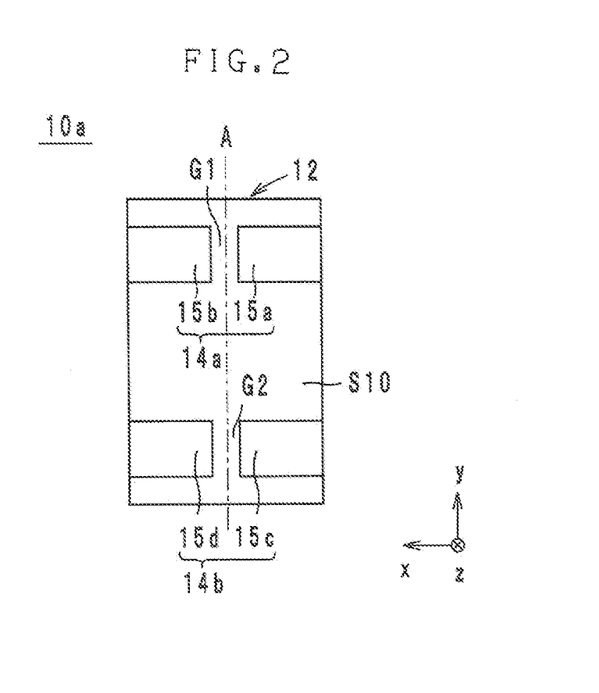
FIG. 2 is a plan view in a stacking direction of the electronic component according to the first exemplary embodiment.
Figure 3:
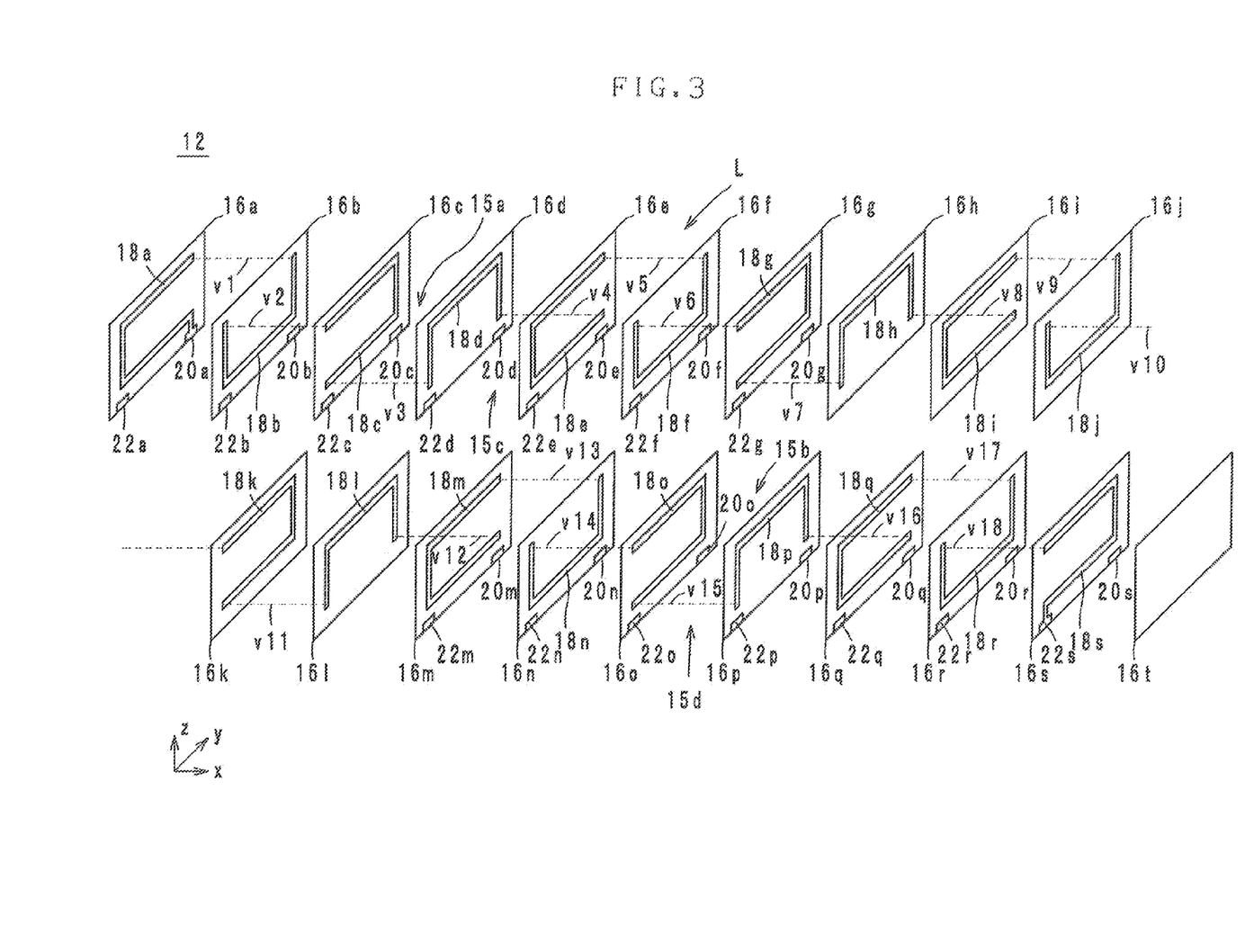
FIG. 3 is an exploded perspective view of a stack of the electronic component according to the first exemplary embodiment.

An electronic component according to a first exemplary embodiment will now be described with reference to the drawings. FIG. 1 is an external perspective view of an electronic component 10a according to the first exemplary embodiment. FIG. 2 is a plan view in a stacking direction of the electronic component 10a according to the first exemplary embodiment. FIG. 3 is an exploded perspective view of a stack 12 of the electronic component 10a according to the first exemplary embodiment. Hereinafter, a stacking direction of the electronic component 10a is defined as an x-axis direction, and in plan view in the x-axis direction, a direction extending along the short side of the electronic component 10a is defined as a z-axis direction, and a direction extending along the long side of the electronic component 10a is defined as a y-axis direction. The x axis, y axis, and z axis are orthogonal to one another.

As shown in FIGS. 1 to 3, the exemplary electronic component 10a includes the stack, or body 12; outer electrodes 14a, 14b, sometimes collectively referred to herein as outer electrodes 14; connection conductors (inner conductors) 20a to 20g and 20m to 20s, sometimes collectively referred to herein as connection conductors (inner conductors) 20; connection conductors (inner conductors) 22a to 22g and 22m to 22s, sometimes collectively referred to herein as connection conductors (inner conductors) 22; and a coil L.

The stack 12 has a rectangular-parallelepiped shape, and is embedded with the connection conductors 20 and 22, and the coil L. Hereinafter, a surface at the negative side in the z-axis direction of the stack 12 is defined as a lower surface S10.

As shown in FIG. 3, the stack 12 is configured by stacking insulating layers 16a to 16t, sometimes collectively referred to herein as 16 stacking insulating layers, in that order from the negative side to the positive side in the x-axis direction. The insulating layers 16 each have a rectangular shape, and are each fabricated with a magnetic material. Hereinafter, a surface at the positive side in the x-axis direction of each insulating layer 16 is referred to as front surface, and a surface at the negative side in the x-axis direction of each insulating layer 16 is referred to as back surface.

As shown in FIG. 3, the coil L is configured by coil conductors (inner conductors) 18a to 18s, sometimes collectively referred to herein as conductors (inner conductors) 18, and via-hole conductors v1 to v18. That is, the coil L is configured such that the coil conductors 18a to 18s are connected in series by the via-hole conductors v1 to v18. The coil L has a coil axis extending in the x-axis direction. The coil L has a helix shape extending from the negative side to the positive side in the x-axis direction while turning clockwise.

As shown in FIG. 3, the coil conductors 18a to 18s are provided on the front surfaces of the insulating layers 16a to 16s, respectively. The coil conductors 18a to 18s are each formed of a conductive material, and each has a number of turns being ¾ turn. In addition, each of the coil conductors 18a to 18s has a shape in which a linear conductor is bent. That is, the coil conductors 18a to 18s each have a shape in which part (¼) of a rectangular ring-shaped conductor is cut, or cutout. Hereinafter, regarding the coil conductors 18a to 18s, an end at the upstream side in the clockwise direction is called upstream end, and an end at the downstream side in the clockwise direction is called downstream end.

The via-hole conductors v1 to v18 penetrate through the insulating layers 16b to 16s in the x-axis direction, respectively, and connect the coil conductors 18a to 18s in series. More specifically, the via-hole conductor v1 connects the downstream end of the coil conductor 18a to the upstream end of the coil conductor 18b. The via-hole conductor v2 connects the downstream end of the coil conductor 18b to the upstream end of the coil conductor 18c. The via-hole conductor v3 connects the downstream end of the coil conductor 18c to the upstream end of the coil conductor 18d. The via-hole conductor v4 connects the downstream end of the coil conductor 18d to the upstream end of the coil conductor 18e. The via-hole conductor v5 connects the downstream end of the coil conductor 18e to the upstream end of the coil conductor 18f. The via-hole conductor v6 connects the downstream end of the coil conductor 18f to the upstream end of the coil conductor 18g. The via-hole conductor v7 connects the downstream end of the coil conductor 18g to the upstream end of the coil conductor 18h. The via-hole conductor v8 connects the downstream end of the coil conductor 18h to the upstream end of the coil conductor 18i. The via-hole conductor v9 connects the downstream end of the coil conductor 18i to the upstream end of the coil conductor 18j. The via-hole conductor v10 connects the downstream end of the coil conductor 18j to the upstream end of the coil conductor 18k. The via-hole conductor v11 connects the downstream end of the coil conductor 18k to the upstream end of the coil conductor 18l. The via-hole conductor v12 connects the downstream end of the coil conductor 18l to the upstream end of the coil conductor 18m. The via-hole conductor v13 connects the downstream end of the coil conductor 18m to the upstream end of the coil conductor 18n. The via-hole conductor v14 connects the downstream end of the coil conductor 18n to the upstream end of the coil conductor 18o. The via-hole conductor v15 connects the downstream end of the coil conductor 18o to the upstream end of the coil conductor 18p. The via-hole conductor v16 connects the downstream end of the coil conductor 18p to the upstream end of the coil conductor 18q. The via-hole conductor v17 connects the downstream end of the coil conductor 18q to the upstream end of the coil conductor 18r. The via-hole conductor v18 connects the downstream end of the coil conductor 18r to the upstream end of the coil conductor 18s.

The connection conductors 20a to 20g are rectangular conductive layers provided on the front surfaces of the insulating layers 16a to 16g, respectively, such that the connection conductors 20a to 20g are adjacent to the respective long sides at the negative side in the z-axis direction. Also, the connection conductors 20a to 20g are superposed on one another in an aligned manner in plan view in the x-axis direction. Accordingly, when the insulating layers 16 are stacked, the connection conductors 20a to 20g are exposed from the lower surface S10 within a rectangular region. Further, as shown in FIG. 3, the connection conductor 20a is connected to the upstream end of the coil conductor 18a.

The connection conductors 20m to 20s are rectangular conductive layers provided on the front surfaces of the insulating layers 16m to 16s, respectively, such that the connection conductors 20m to 20s are adjacent to the respective long sides at the negative side in the z-axis direction. Also, the connection conductors 20m to 20s are superposed on one another in an aligned manner in plan view in the z-axis direction. Accordingly, when the insulating layers 16 are stacked, the connection conductors 20m to 20s are exposed from the lower surface S10 within a rectangular region.

The connection conductors 20a to 20g and the connection conductors 20m to 20s are superposed in an aligned manner in plan view in the z-axis direction. Also, the connection conductors 20a to 20g are seven layers, and the connection conductors 20m to 20s are seven layers. Hence, the connection conductors 20a to 20g are symmetric to the connection conductors 20m to 20s about the insulating layer 16j.

The connection conductors 22a to 22g are rectangular conductive layers provided on the front surfaces of the insulating layers 16a to 16g, respectively, such that the connection conductors 22a to 22g are adjacent to the respective long sides at the negative side in the z-axis direction. The connection conductors 22a to 22g are located at the negative side in the y-axis direction with respect to the connection conductors 20a to 20g, respectively. Also, the connection conductors 22a to 22g are superposed on one another in an aligned manner in plan view in the z-axis direction. Accordingly, when the insulating layers 16 are stacked, the connection conductors 22a to 22g are exposed from the lower surface S10 within the rectangular region.

The connection conductors 22m to 22s are rectangular conductive layers provided on the front surfaces of the insulating layers 16m to 16s, respectively, such that the connection conductors 22m to 22s are adjacent to the respective long sides at the negative side in the z-axis direction. The connection conductors 22m to 22s are located at the negative side in the y-axis direction with respect to the connection conductors 20m to 20s, respectively. Also, the connection conductors 22m to 22s are superposed on one another in an aligned manner in plan view in the z-axis direction. Accordingly, when the insulating layers 16 are stacked, the connection conductors 22m to 22s are exposed from the lower surface S10 within the rectangular region. Further, as shown in FIG. 3, the connection conductor 22s is connected to the downstream end of the coil conductor 18s.

The connection conductors 22a to 22g and the connection conductors 22m to 22s are superposed in an aligned manner in plan view in the z-axis direction. Also, the connection conductors 22a to 22g are seven layers, and the connection conductors 22m to 22s are seven layers. Hence, the connection conductors 22a to 22g are symmetric to the connection conductors 22m to 22s about the insulating layer 16j.

The connection conductors 20 and 22 are not provided on the insulating layers 16h to 16l.

As shown in FIGS. 1 and 2, the outer electrodes 14a and 14b are provided on the lower surface S10 of the stack 12 to be arranged in the y-axis direction. The outer electrode 14a is divided into outer electrode portions 15a and 15b by a groove G1 parallel to the y-axis direction. The outer electrode portion 15a is a rectangular conductor that is formed by plating so that part of the connection conductors 20a to 20g in FIG. 3 exposed from the lower surface S10 is covered with the outer electrode portion 15a. The outer electrode portion 15b is a rectangular conductor that is formed by plating so that part of the connection conductors 20m to 20s in FIG. 3 exposed from the lower surface S10 is covered with the outer electrode portion 15b. As described above, the connection conductors 20a to 20g are symmetric to the connection conductors 20m to 20s about the insulating layer 16j. Hence, the outer electrode portions 15a and 15b have structures being symmetric about a line A parallel to the z-axis direction. The line A is aligned with the insulating layer 16j in plan view in the z-axis direction.

The outer electrode 14b is provided at the negative side in the y-axis direction with respect to the outer electrode 14a. The outer electrode 14b is divided into outer electrode portions 15c and 15d by a groove G2 parallel to the y-axis direction. The outer electrode portion 15c is a rectangular conductor that is formed by plating so that part of the connection conductors 22a to 22g in FIG. 3 exposed from the lower surface S10 is covered with the outer electrode portion 15c. The outer electrode portion 15d is a rectangular conductor that is formed by plating so that part of the connection conductors 22m to 22s in FIG. 3 exposed from the lower surface S10 is covered with the outer electrode portion 15d. As described above, the connection conductors 22a to 22g are symmetric to the connection conductors 22m to 22s about the insulating layer 16j. Hence, the outer electrode portions 15c and 15d have structures being symmetric about the line A parallel to the z-axis direction.

Figure 4:
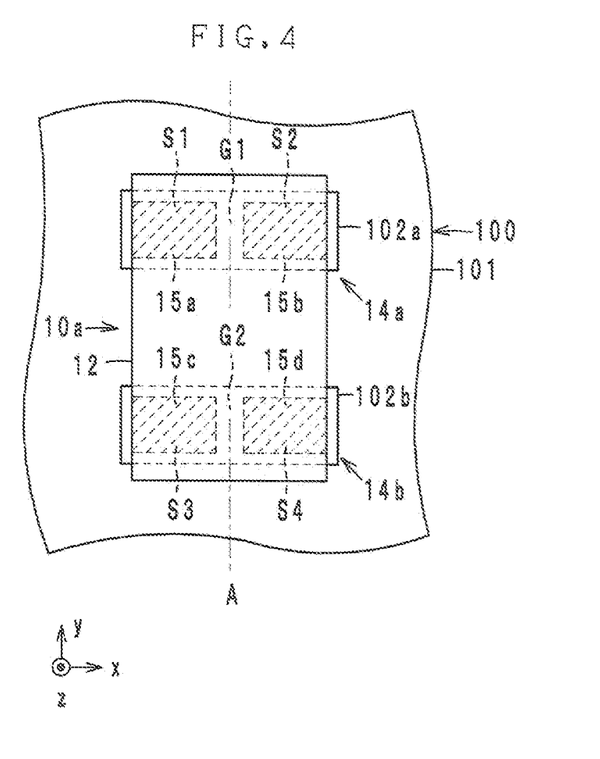
FIG. 4 is a perspective view in a z-axis direction of the electronic component and a circuit board.

The electronic component 10a configured as described above is mounted on the circuit board. Mounting of the electronic component 10a onto the circuit board is described below with reference to the drawing. FIG. 4 is a perspective view in the z-axis direction of the electronic component 10a and a circuit board 100.

As shown in FIG. 4, the circuit board 100 includes a board body 101 and lands 102a and 102b, which are sometimes collectively referred to as lands 102. The board body 101 is, for example, a multilayer wiring board. The lands 102 are electrodes for external connection provided on the principal surface of the board body 101.

When the electronic component 10a is mounted on the circuit board 100, the lower surface S10 serves as a mount surface. That is, the lower surface S10 faces the circuit board 100. The outer electrode 14a (i.e., the outer electrode portions 15a, 15b) is connected to the land 102a. The outer electrode 14b (i.e., the outer electrode portions 15c, 15d) is connected to the land 102b. The outer electrodes 14a and 14b are fixed to the lands 102a and 102b, respectively, by soldering. At this time, it is assumed that respective contact surfaces of the outer electrode 14a to the land 102a are contact surfaces S1 and S2. Also, it is assumed that respective contact surfaces of the outer electrode 14b to the land 102b are contact surfaces S3 and S4.

Since the outer electrode 14a is divided into the outer electrode portions 15a and 15b by the groove G1, a contact surface of the outer electrode 14a to the land 102a is also divided into the contact surfaces S1 and S2 by the groove G1. Further, since the outer electrode portions 15a and 15b have structures being symmetric about the line A, the contact surfaces S1 and S2 also have structures being symmetric about the line A.

Since the outer electrode 14b is divided into the outer electrode portions 15c and 15d by the groove G2, a contact surface of the outer electrode 14b to the land 102b is also divided into the contact surfaces S3 and S4 by the groove G2. Further, since the outer electrode portions 15c and 15d have structures being symmetric about the line A, the contact surfaces S3 and S4 also have structures being symmetric about the line A.

An exemplary manufacturing method of the electronic component 10a will be described below with reference to the drawing. In the following description, the exemplary manufacturing method of the electronic component 10a includes simultaneously manufacturing a plurality of the electronic components 10a.

First, respective ceramic green sheets, which become the insulating layers 16 in FIG. 3, are prepared. More specifically, respective materials of ferric oxide (Fe$_2$O$_3$), zinc oxide (ZnO), copper oxide (CuO), and nickel oxide (NiO) are weighed according to a predetermined ratio, the materials as raw materials are put into a ball mill, and the materials are mixed in wet condition. The obtained mixture is dried and then crushed, and the obtained powder is temporarily sintered at 800° C. for one hour. The obtained temporarily sintered powder is crushed by a ball mill in wet condition, dried, and then disintegrated to obtain ferrite ceramic powder.

A binder (vinyl acetate, water-soluble acryl, etc.), a plasticizer, a humectant, and a dispersant are added to the ferrite ceramic powder and the powder and the added agents are mixed by a ball mill. Then, defoaming is performed by decompression. The obtained ceramic slurry is provided in a sheet form on a carrier sheet by a doctor blade method, and is dried, thereby fabricating a ceramic green sheet, which becomes each insulating layer 16.

Then, as shown in FIG. 3, the via-hole conductors v1 to v18 are formed in the respective ceramic green sheets, which become the insulating layers 16b to 16s. More specifically, the respective ceramic green sheets, which become the insulating layers 16b to 16s, are irradiated with a laser beam, and hence via holes are formed. Then, the via holes are filled with conductive paste, such as Ag, Pd, Cu, Au, or an alloy including any one of these metals, by a method such as application by printing.

Next, as shown in FIG. 3, the coil conductors 18a to 18s and the connection conductors 20a to 20g, 20m to 20s, 22a to 22g, and 22m to 22s are formed on the front surfaces of the respective ceramic green sheets, which become the insulating layers 16a to 16s. More specifically, the coil conductors 18a to 18s and the connection conductors 20a to 20g, 20m to 20s, 22a to 22g, and 22m to 22s are formed by applying conductive paste made of Ag, Pd, Cu, Au, or an alloy including any one of these metals as a principal component on each of the front surfaces of the respective ceramic green sheets, which become the insulating layers 16a to 16s, by screen printing, photolithography, etc. Alternatively, the step of forming the coil conductors 18a to 18s and the connection conductors 20a to 20g, 20m to 20s, 22a to 22g, and 22m to 22s and the step of filling the via holes with the conductive paste may be performed in the same step.

Then, as shown in FIG. 3, the respective ceramic green sheets, which become the insulating layers 16a to 16t, are stacked and press-bonded in that order, and hence an unfired mother stack is obtained. Stacking and press-bonding of the respective ceramic green sheets, which become the insulating layers 16a to 16t, are performed such that a mother stack is obtained by stacking the ceramic green sheets one by one and temporarily press-bonding the ceramic green sheets and then the unfired mother stack is finally press-bonded by pressing with a hydraulic press etc.

Then, the mother stack is cut into stacks 12 each having predetermined dimensions by a cutting blade. Accordingly, the stack 12 in which the connection conductors 20 and 22 are exposed from the lower surface S10 is obtained. At this time, the connection conductor 20 is not exposed at part arranged between part formed with the outer electrode portion 15a (i.e., part corresponding to the contact surface S1) and part formed with the outer electrode portion 15b (i.e., part corresponding to the contact surface S2). The connection conductor 22 is not exposed at part arranged between part formed with the outer electrode portion 15c (i.e., part corresponding to the contact surface S3) and part formed with the outer electrode portion 15d (i.e., part corresponding to the contact surface S4).

Then, binder removing processing and firing are performed on the unfired stack 12. Binder removing processing is performed, for example, under conditions at 500° C. for 2 hours in low oxygen atmosphere. Firing is performed, for example, under conditions at temperatures from 800° C. to 900° C. for 2.5 hours.

Then, the outer electrodes 14 are formed by plating of Ni/Sn plating so that the connection conductors 20 and 22 exposed from the lower surface S10 are covered with the outer electrodes 14. As described above, the connection conductor 20 is not exposed at the part arranged between the part formed with the outer electrode portion 15a and the part formed with the outer electrode portion 15b. The connection conductor 22 is not exposed at the part arranged between the part formed with the outer electrode portion 15c and the part formed with the outer electrode portion 15d. Hence, the grooves G1 and G2 are formed between the outer electrode portions 15a and 15b and between the outer electrode portions 15c and 15d, respectively. With the above steps, the electronic component 10a as shown in FIG. 1 is completed.

With the electronic component 10a, the electronic component 10a can be prevented from being mounted on the circuit board 100 with inclination. More specifically, the contact surface of the outer electrode 14a with respect to the land 102a is divided into the contact surfaces S1 and S2 by the groove G1. Hence, a surface of solder is formed at the groove G1. Accordingly, with the electronic component 10a, the surface area of the solder is increased as compared with an electronic component in which its contact surface is not divided into contact surfaces S1 and S2. As the result, a surface tension of the solder is increased, and when the solder is liquefied, attraction forces between the outer electrode 14a and the land 102a and the outer electrode 14b and the land 102b are increased.

Further, the outer electrodes 14a and 14b are arranged in the y-axis direction, the contact surfaces S1 and S2 have structures being symmetric about the line A parallel to the y-axis direction, and the contact surfaces S3 and S4 have structures being symmetric about the line A parallel to the y-axis direction. Hence, the magnitude of a force that acts between the outer electrode portion 15a and the land 102a at the contact surface S1 can become close to the magnitude of a force that acts between the outer electrode portion 15b and the land 102a at the contact surface S2. Similarly, the magnitude of a force that acts between the outer electrode portion 15c and the land 102b at the contact surface S3 can become close to the magnitude of a force that acts between the outer electrode portion 15d and the land 102b at the contact surface S4. Hence, a rotation moment of the electronic component 10a around the line A is canceled, and becomes close to zero. As described above, with the electronic component 10a, a force of attracting the electronic component 10a to the circuit board 100 is increased, and rotation of the electronic component 10a around the line A is prevented. Accordingly, the electronic component 10a can be prevented from being mounted on the circuit board 100 with inclination.

Figure 5:
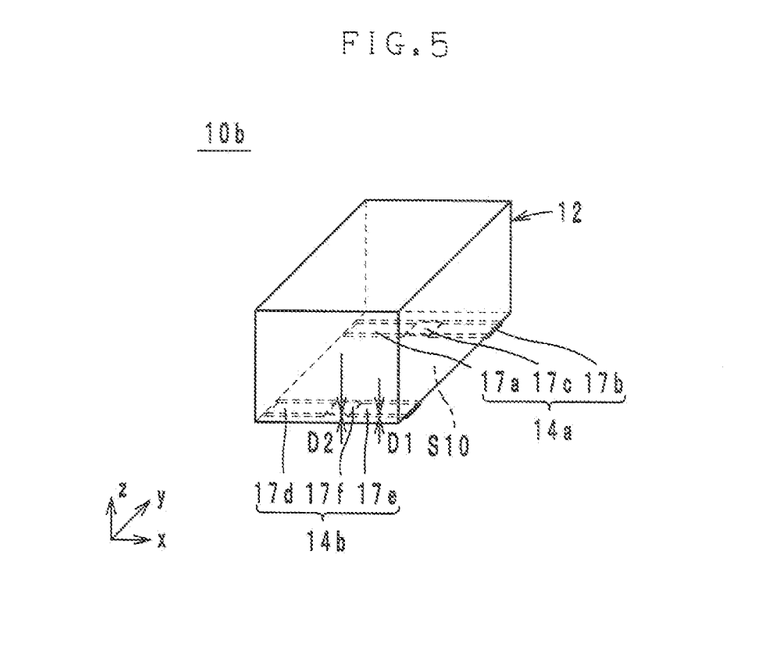
FIG. 5 is an external perspective view of an electronic component according to a first exemplary modification.
Figure 6:
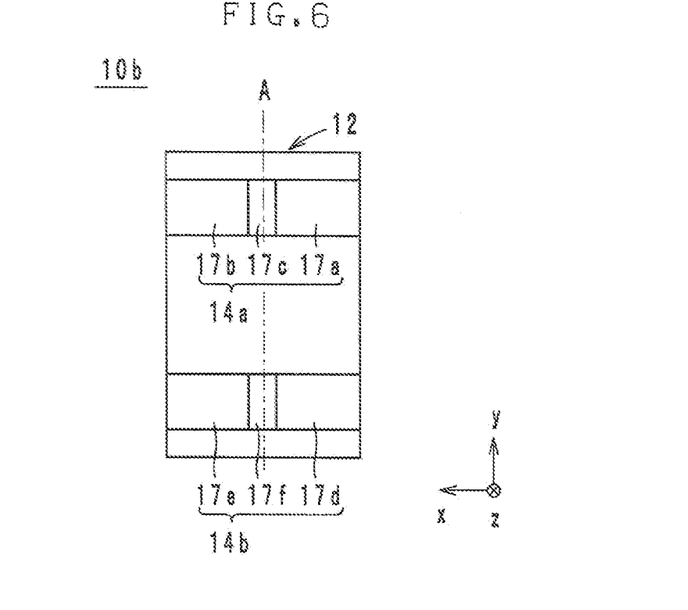
FIG. 6 is a plan view in the z-axis direction of the electronic component according to the first exemplary modification.
Figure 7:
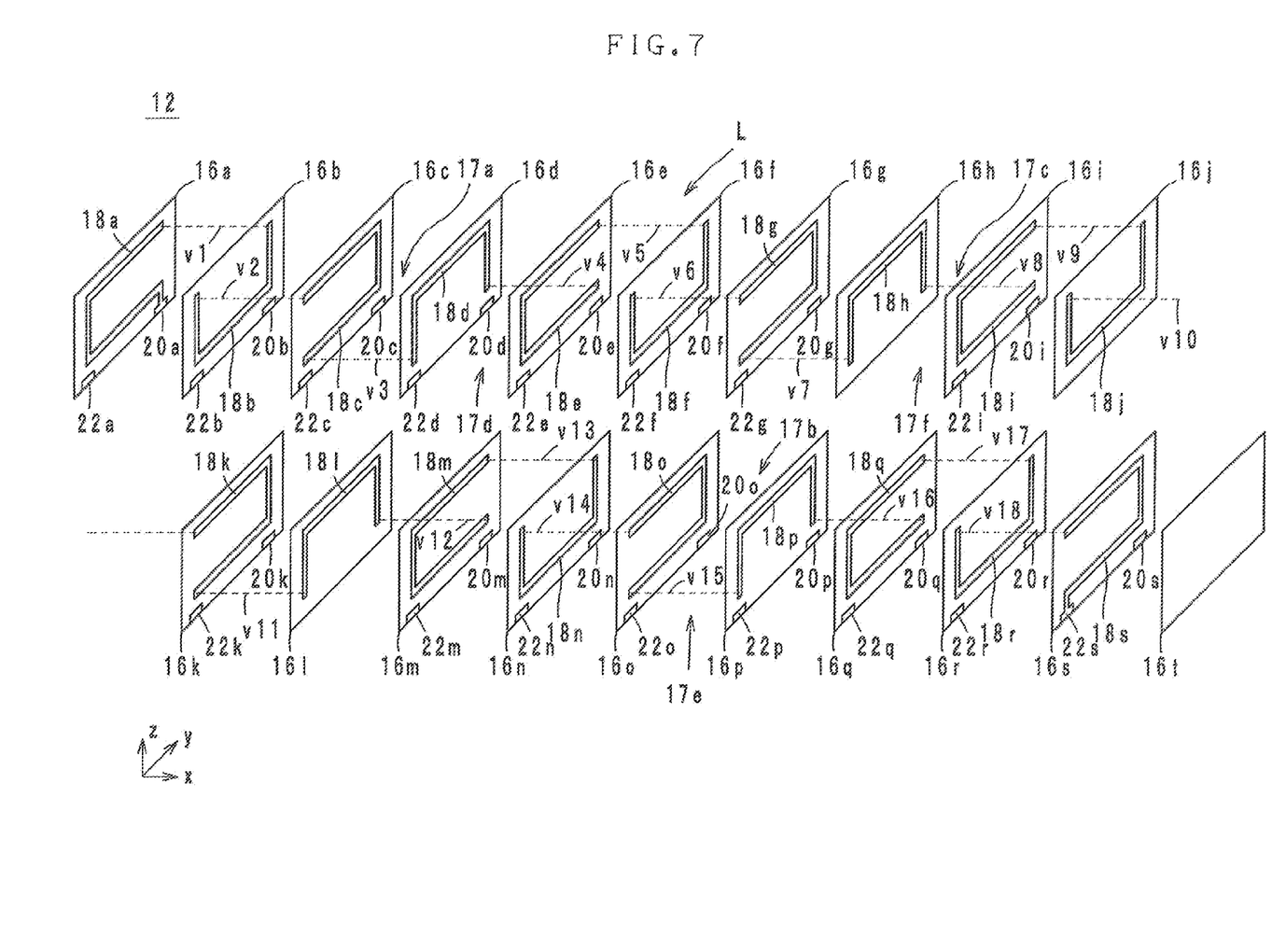
FIG. 7 is an exploded perspective view of a stack of the electronic component according to the first exemplary modification.

Hereinafter, an electronic component 10b according to a first exemplary modification is described below with reference to the drawings. FIG. 5 is an external perspective view of an electronic component 10b according to the first exemplary modification. FIG. 6 is a plan view in the z-axis direction of the electronic component 10b according to the first exemplary modification. FIG. 7 is an exploded perspective view of a stack 12 of the electronic component 10b according to the first exemplary modification.

The electronic component 10b differs from the electronic component 10a in the configuration of the outer electrodes 14a and 14b. For other points, the electronic component 10b is similar to the electronic component 10a, and hence a description thereof will not be repeated here.

In the electronic component 10b, outer electrodes 14a and 14b are not divided, as shown in FIGS. 5 and 6. The thickness of part of the outer electrodes 14a and 14b is smaller than the thickness of the other part of the outer electrodes 14a and 14b. The outer electrode 14a is configured of outer electrode portions 17a to 17c. The outer electrode portions 17a, 17c, and 17b have rectangular shapes, and are provided to be arranged in line in that order from the negative side to the positive side in the x-axis direction, as shown in FIG. 6. The outer electrode portion 17c has a thickness D2 that is smaller than a thickness D1 of the outer electrode portion 17a and a thickness D1 of the outer electrode portion 17b. The outer electrode portions 17a to 17c have a structure being symmetric about a line A.

The outer electrode 14b is configured of outer electrode portions 17d to 17f. The outer electrode portions 17d, 17f, and 17e have rectangular shapes, and are provided to be arranged in line in that order from the negative side to the positive side in the x-axis direction, as shown in FIG. 6. The outer electrode portion 17f has a thickness D2 that is smaller than a thickness D1 of the outer electrode portion 17d and a thickness D1 of the outer electrode portion 17e. The outer electrode portions 17d to 17f have a structure being symmetric about the line A.

While the electronic component 10a has the above-described outer electrodes 14a and 14b, as shown in FIG. 7, connection conductors 20i, 22i, 20k, and 22k are provided on the front surfaces of the insulating layers 16i and 16k. More specifically, in the electronic component 10a, the connection conductors 20 and 22 are not provided on the insulating layers 16i to 16l so that an outer electrode portion is not formed between the outer electrode portions 15a and 15b, or between the outer electrode portions 15c and 15d.

In contrast, in the electronic component 10b, the outer electrode portion 17c is provided between the outer electrode portions 17a and 17b, and the outer electrode portion 17f is provided between the outer electrode portions 17d and 17e, the outer electrode portions 17c and 17f being thinner than the outer electrode portions 17a, 17b, 17d, and 17e. Hence, the connection conductors 20i, 20k, 22i, and 22k are provided part of the insulating layers 16i to 16l located between the outer electrode portions 17a and 17b, and between the outer electrode portions 17d and 17e. Hence, the ratio of the area occupied by the connection conductors 20 in the part formed with the outer electrode portion 17c arranged between the part formed with the outer electrode portion 17a (i.e., contact surface S1) and the part formed with the outer electrode portion 17b (i.e., contact surface S2) is smaller than the ratio of the area occupied by the connection conductors 20 in the part formed with each of the outer electrode portions 17a and 17b. The ratio of the area occupied by the connection conductors 22 in the part formed with the outer electrode portion 17f arranged between the part formed with the outer electrode portion 17d (i.e., contact surface S3) and the part formed with the outer electrode portion 17f (i.e., contact surface S4) is smaller than the ratio of the area occupied by the connection conductors 22 in the part formed with each of the outer electrode portions 17d and 17e. When the outer electrodes 14a and 14b are formed by plating, the outer electrode portion 17c is provided between the outer electrode portions 17a and 17b, and the outer electrode portion 17f is provided between the outer electrode portions 17d and 17e, the outer electrode portions 17c and 17f being thinner than the outer electrode portions 17a, 17b, 17d, and 17e.

Figure 8:
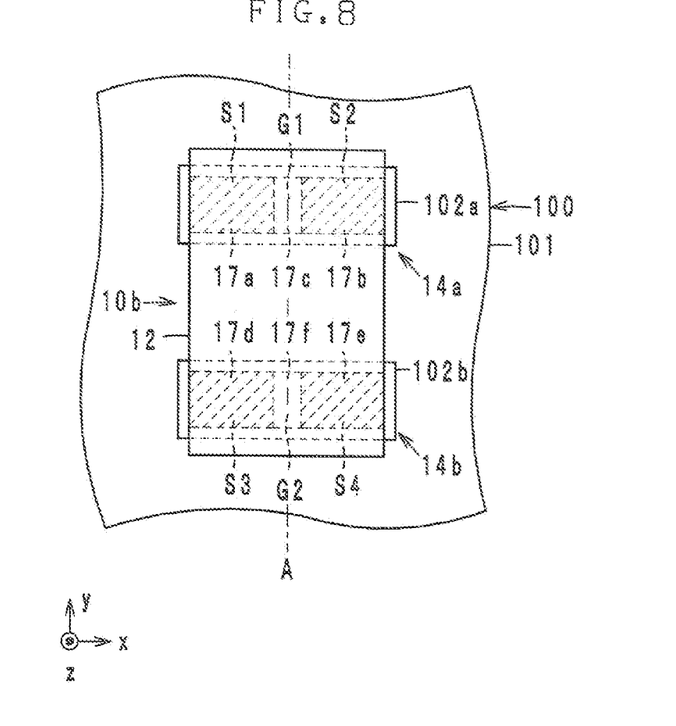
FIG. 8 is a perspective view in the z-axis direction of the electronic component and a circuit board.

The electronic component 10b configured as described above is mounted on the circuit board. Mounting of the electronic component 10b onto the circuit board is described below with reference to the drawing. FIG. 8 is a perspective view in the z-axis direction of the electronic component 10b and the circuit board 100.

When the electronic component 10b is mounted on the circuit board 100, the lower surface S10 of the electronic component 10b serves as a mount surface. That is, the lower surface S10 faces the circuit board 100. The outer electrode 14a including the outer electrode portions 17a and 17b are connected to the land 102a. The outer electrode 14b including the outer electrode portions 17d and 17e are connected to the land 102b. The outer electrodes 14a and 14b are fixed to the lands 102a and 102b, respectively, by soldering. At this time, it is assumed that respective contact surfaces of the outer electrode 14a to the land 102a are the contact surfaces S1 and S2. Also, it is assumed that respective contact surfaces of the outer electrode 14b to the land 102b are the contact surfaces S3 and S4.

The outer electrode 14a is configured such that the relatively thin outer electrode portion 17c is arranged between the relatively thick outer electrode portions 17a and 17b. Since the outer electrode portion 17c does not come into contact with the land 102a, the contact surface of the outer electrode 14a to the land 102a is divided into contact surfaces S1 and S2 by the groove G1 formed by the outer electrode portion 17c. Further, since the outer electrode portions 17a and 17b have structures being symmetric about the line A, the contact surfaces S1 and S2 also have structures being symmetric about the line A.

The outer electrode 14b is configured such that the relatively thin outer electrode portion 17f is arranged between the relatively thick outer electrode portions 17d and 17e. Since the outer electrode portion 17f does not come into contact with the land 102b, the contact surface of the outer electrode 14b to the land 102b is divided into the contact surfaces S3 and S4 by the groove G2 formed by the outer electrode portion 17f. Further, since the outer electrode portions 17d and 17e have structures being symmetric about the line A, the contact surfaces S3 and S4 also have structures being symmetric about the line A.

With the electronic component 10b configured as described above, similarly to the electronic component 10a, the electronic component 10b can be prevented from being mounted on the circuit board 100 with inclination.

Figure 9:
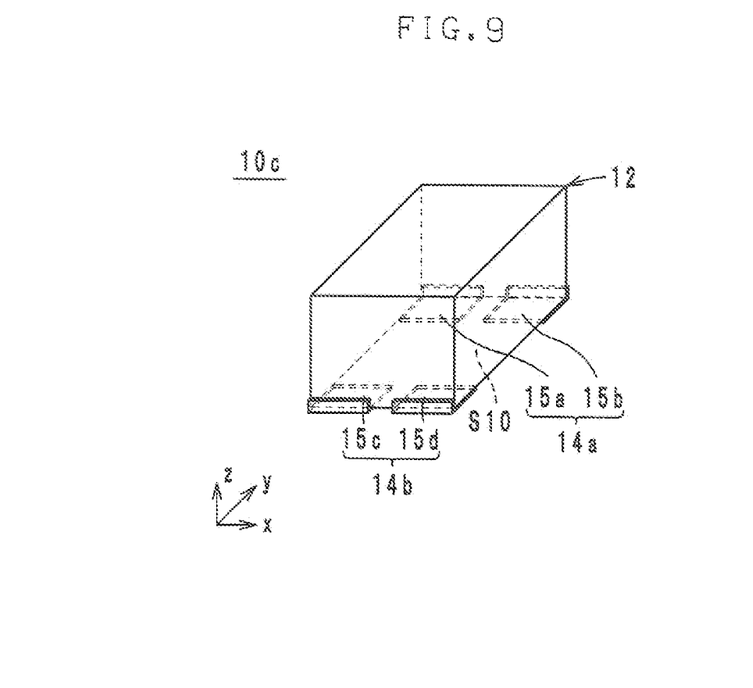
FIG. 9 is an external perspective view of an electronic component according to a second exemplary modification.
Figure 10:
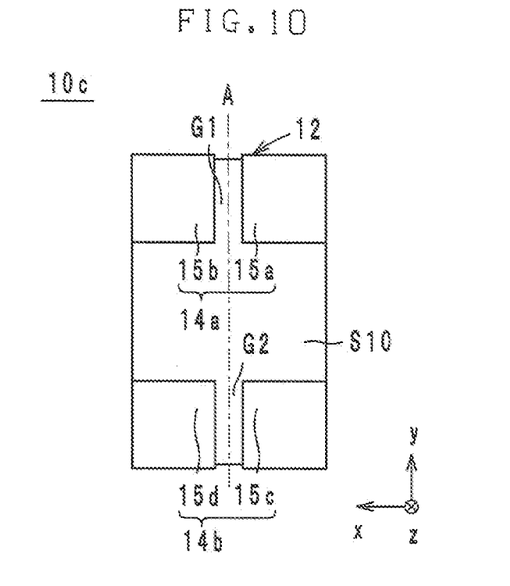
FIG. 10 is a plan view in the z-axis direction of the electronic component according to the second exemplary modification.
Figure 11:
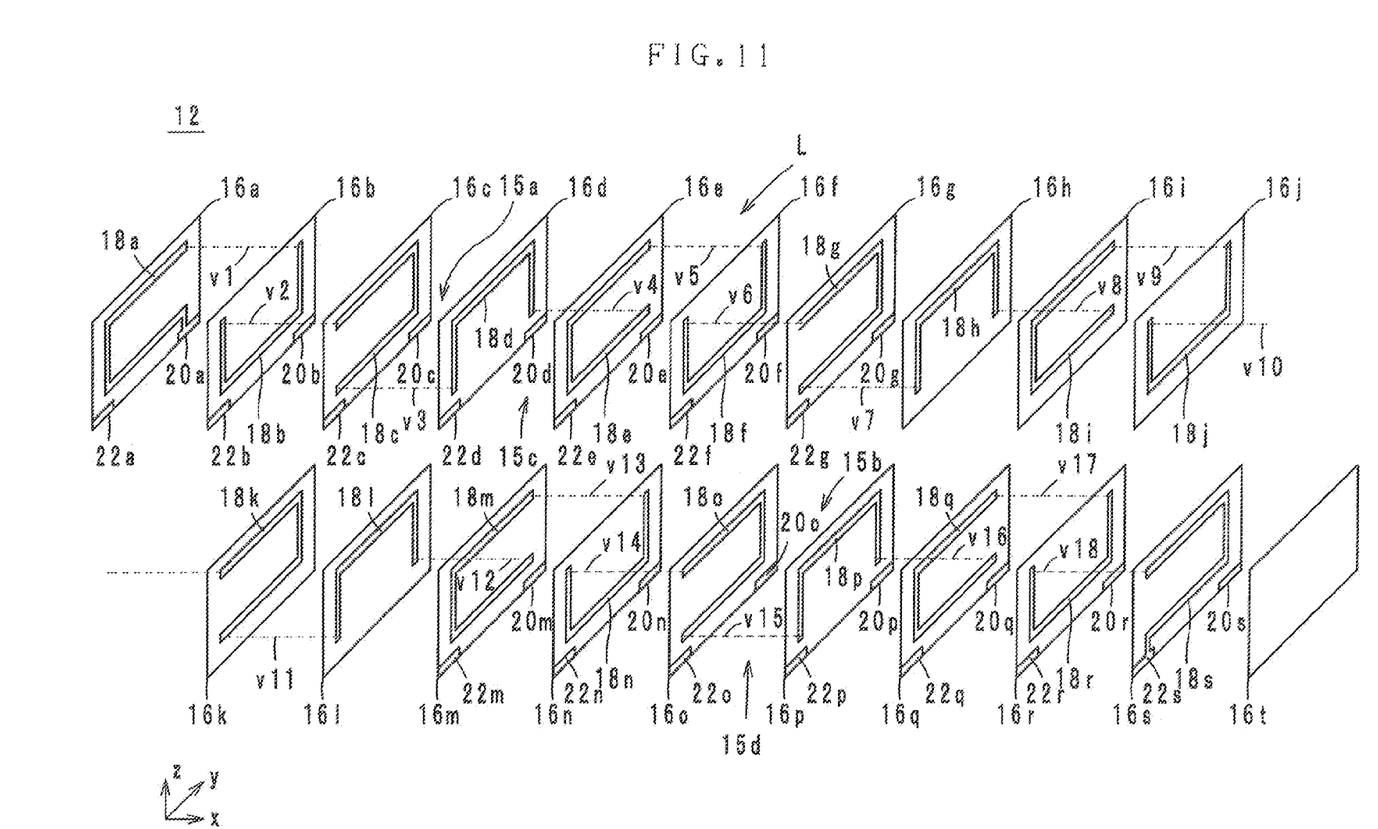
FIG. 11 is an exploded perspective view of a stack of the electronic component according to the second exemplary modification.

Hereinafter, an electronic component 10c according to a second exemplary modification will now be described with reference to the drawings. FIG. 9 is an external perspective view of the electronic component 10c according to the second exemplary modification. FIG. 10 is a plan view in the z-axis direction of the electronic component 10c according to the second exemplary modification. FIG. 11 is an exploded perspective view of a stack 12 of the electronic component 10c according to the second exemplary modification.

The electronic component 10c differs from the electronic component 10a in the configuration of the outer electrodes 14a and 14b. For other points, the electronic component 10c is similar to the electronic component 10a, and hence description thereof will not be repeated here.

In the electronic component 10c, an outer electrode 14a is provided on an end surface at the positive side in the y-axis direction of the stack 12, in addition to the lower surface S10. Similarly, an outer electrode 14b is provided on an end surface at the negative side in the y-axis direction of the stack 12, in addition to the lower surface S10. That is, outer electrode portions 15a to 15d that configure the outer electrodes 14a and 14b each have an L shape.

In the electronic component 10c, connection conductors 20a to 20g, 20m to 20s are adjacent to the respective short sides at the positive side in the y-axis direction of the insulating layers 16a to 16g, and 16m to 16s so that the above-described outer electrodes 14a and 14b are formed. Also, connection conductors 22a to 22g, and 22m to 22s are adjacent to the respective short sides at the negative side in the y-axis direction of the insulating layers 16a to 16g, and 16m to 16s. Hence, the connection conductors 20a to 20g, 20m to 20s, 22a to 22g, and 22m to 22s are exposed from the end surfaces at the positive side and the negative side in the y-axis direction of the stack 12. Thus, the outer electrodes 14a and 14b are formed by plating so as to have the L shapes.

With the electronic component 10c configured as described above, similarly to the electronic component 10a, the electronic component 10c can be prevented from being mounted on the circuit board 100 with inclination.

Figure 12:
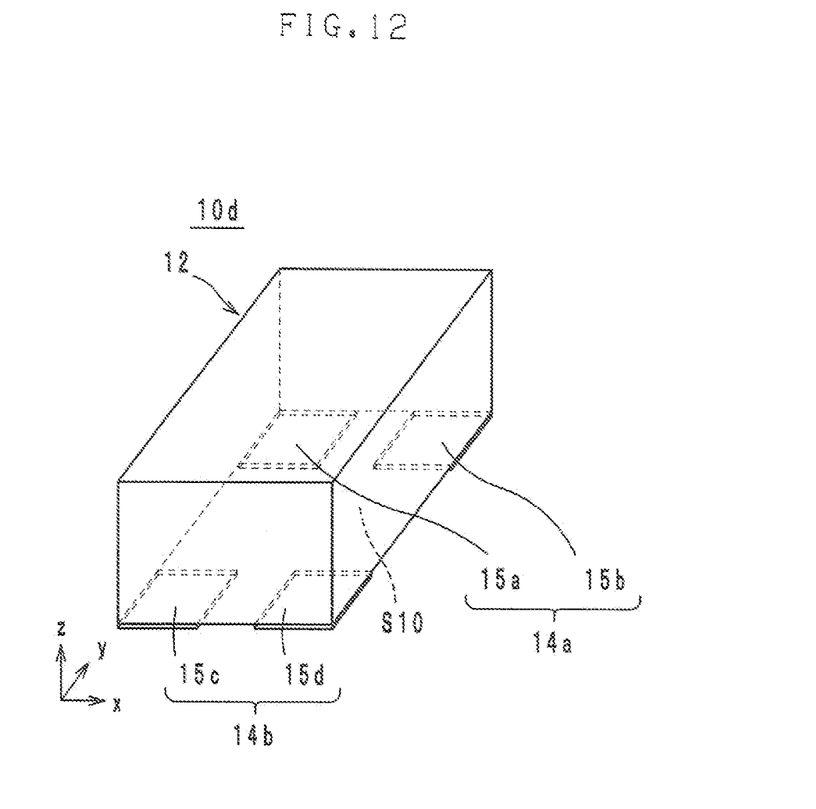
FIG. 12 is an external perspective view of an electronic component according to a second exemplary embodiment.
Figure 13:
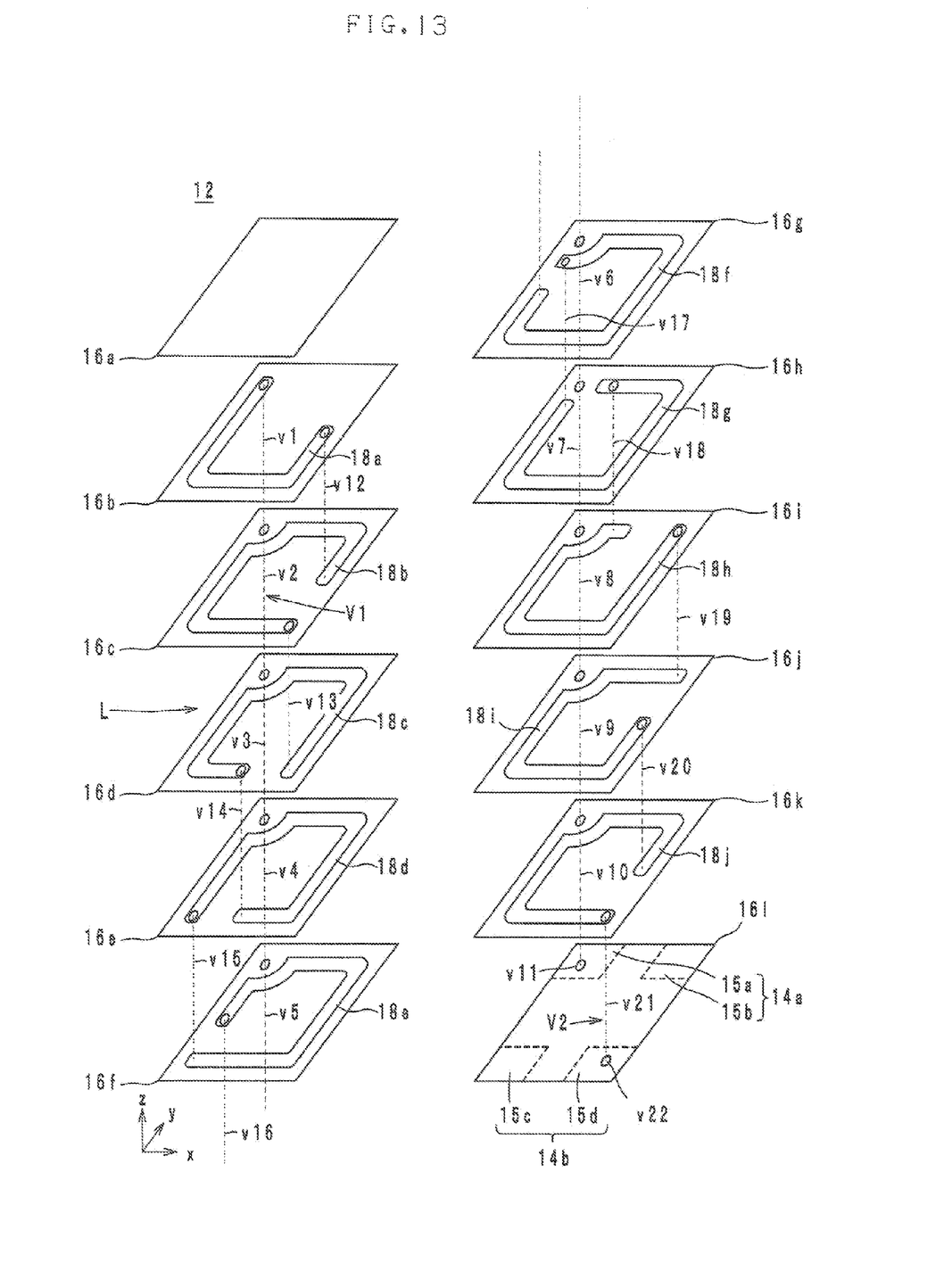
FIG. 13 is an exploded perspective view of a stack of the electronic component according to the second exemplary embodiment.

An electronic component according to a second exemplary embodiment will now be described with reference to the drawings. FIG. 12 is an external perspective view of an electronic component 10d according to the second exemplary embodiment. FIG. 13 is an exploded perspective view of a stack 12 of the electronic component 10d according to the second exemplary embodiment. Hereinafter, a stacking direction of the electronic component 10d is defined as a z-axis direction, and in plan view in the z-axis direction, a direction extending along the short side of the electronic component 10d is defined as an x-axis direction, and a direction extending along the long side of the electronic component 10d is defined as a y-axis direction. The x axis, y axis, and z axis are orthogonal to one another.

As shown in FIGS. 12 and 13, the electronic component 10d includes the stack, or body 12, outer electrodes 14a and 14b, which are sometimes collectively referred to herein as outer electrodes 14, a coil L, and connection portions V1 and V2.

The stack 12 has a rectangular-parallelepiped shape, and is embedded with the coil L and the connection portions V1 and V2. Hereinafter, a surface at the negative side in the z-axis direction of the stack 12 is defined as a lower surface S10.

The outer electrodes 14a and 14b are provided on the lower surface S10 of the stack 12. The configuration of the outer electrodes 14a and 14b in the electronic component 10d is similar to the configuration of the outer electrodes 14a and 14b in the electronic component 10a, and hence description thereof will not be repeated here.

As shown in FIG. 13, the stack 12 is configured by stacking insulating layers 16a to 16l, which are sometimes collectively referred to as insulating layers 16, in that order from the positive side to the negative side in the z-axis direction. The insulating layers 16 each have a rectangular shape, and are each fabricated with a magnetic material. Hereinafter, a surface at the positive side in the z-axis direction of each insulating layer 16 is referred to as front surface, and a surface at the negative side in the z-axis direction of each insulating layer 16 is referred to as back surface.

The coil L includes coil conductors 18a to 18j, which are sometimes collectively referred to as coil conductors 18, and via-hole conductors v12 to v20. That is, the coil L is configured such that the coil conductors 18a to 18j are connected in series by the via-hole conductors v12 to v20. The coil L has a coil axis extending in the z-axis direction. The coil L has a helix shape extending from the positive side to the negative side in the z-axis direction while turning counterclockwise.

As shown in FIG. 13, the coil conductors 18a to 18j are provided on the front surfaces of the insulating layers 16b to 16k, respectively. The coil conductors 18a to 18j are each formed of a conductive material, each have a number of turns being ⅞ turn, and are each formed by bending a linear conductor. However, the coil conductor 18a has a number of turns being ⅝ turn. That is, the coil conductors 18a to 18j each have a shape in which part of a rectangular ring-shaped conductor is cut, or cutout (i.e., ⅜ being cut for the coil conductor 18a, and ⅛ being cut for each of the coil conductors 18b to 18j). Hereinafter, regarding the coil conductors 18a to 18j, an end at the upstream side in the counterclockwise direction is called upstream end, and an end at the downstream side in the counterclockwise direction is called downstream end.

The via-hole conductors v12 to v20 penetrate through the insulating layers 16b to 16j in the z-axis direction, respectively, and connect the coil conductors 18a to 18j in series. More specifically, the via-hole conductor v12 connects the downstream end of the coil conductor 18a to the upstream end of the coil conductor 18b. The via-hole conductor v13 connects the downstream end of the coil conductor 18b to the upstream end of the coil conductor 18c. The via-hole conductor v14 connects the downstream end of the coil conductor 18c to the upstream end of the coil conductor 18d. The via-hole conductor v15 connects the downstream end of the coil conductor 18d to the upstream end of the coil conductor 18e. The via-hole conductor v16 connects the downstream end of the coil conductor 18e to the upstream end of the coil conductor 18f. The via-hole conductor v17 connects the downstream end of the coil conductor 18f to the upstream end of the coil conductor 18g. The via-hole conductor v18 connects the downstream end of the coil conductor 18g to the upstream end of the coil conductor 18h. The via-hole conductor v19 connects the downstream end of the coil conductor 18h to the upstream end of the coil conductor 18i. The via-hole conductor v20 connects the downstream end of the coil conductor 18i to the upstream end of the coil conductor 18j.

As shown in FIG. 13, the connection portion V1 is configured such that via-hole conductors v1 to v11 penetrate through the insulating layers 16b to 16l, respectively, in the z-axis direction and are connected in line. The connection portion V1 is provided in the stack 12, and connects the end at the positive side in the z-axis direction of the coil L, i.e., the upstream end of the coil conductor 18a, to an outer electrode portion 15a of the outer electrode 14a.

As shown in FIG. 13, the connection portion V2 is configured such that via-hole conductors v21 and v22 penetrate through the insulating layers 16k and 16l, respectively, in the z-axis direction. The connection portion V2 is provided in the stack 12, and connects the end at the negative side in the z-axis direction of the coil L, i.e., the downstream end of the coil conductor 18j, to an outer electrode portion 15d of the outer electrode 14b.

An exemplary manufacturing method of the electronic component 10d will now be described with reference to the drawing. In the following description, the exemplary manufacturing method of the electronic component 10d includes simultaneously manufacturing a plurality of the electronic components 10d.

First, respective ceramic green sheets, which become the insulating layers 16 in FIG. 13, are prepared. More specifically, respective materials of ferric oxide ($Fe_2O_3$), zinc oxide (ZnO), copper oxide (CuO), and nickel oxide (NiO) are weighed according to a predetermined ratio, the materials as raw materials are put into a ball mill, and the materials are mixed in wet condition. The obtained mixture is dried and then crushed, and the obtained powder is temporarily sintered at 800° C. for one hour. The obtained temporarily sintered powder is crushed by a ball mill in wet condition, dried, and then disintegrated to obtain ferrite ceramic powder.

A binder (vinyl acetate, water-soluble acryl, etc.), a plasticizer, a humectant, and a dispersant are added to the ferrite ceramic powder and the powder and the added agents are mixed by a ball mill. Then, defoaming is performed by decompression. The obtained ceramic slurry is provided in a sheet form on a carrier sheet by a doctor blade method, and is dried, thereby fabricating a ceramic green sheet, which becomes each insulating layer 16.

Then, as shown in FIG. 13, the via-hole conductors v1 to v22 are formed in the respective ceramic green sheets, which become the insulating layers 16b to 16l. More specifically, the respective ceramic green sheets, which become the insulating layers 16b to 16l, are irradiated with a laser beam, and hence via holes are formed. Then, the via holes are filled with conductive paste, such as Ag, Pd, Cu, Au, or an alloy of these metals, by a method such as application by printing.

Then, as shown in FIG. 13, the coil conductors 18a to 18j are formed on the front surfaces of the respective ceramic green sheets, which become the insulating layers 16b to 16k. More specifically, the coil conductors 18a to 18j are formed by applying conductive paste made of Ag, Pd, Cu, Au, or an alloy of these metals as a principal component, on each of the front surfaces of the respective ceramic green sheets, which become the insulating layers 16b to 16k, by screen printing, photolithography, etc. Alternatively, the step of forming the coil conductors 18a to 18j and the step of filling the via holes with the conductive paste may be performed in the same step.

Then, as shown in FIG. 13, respective silver electrodes, which become the outer electrodes 14a and 14b are formed on the back surface of a ceramic green sheet, which becomes the insulating layer 16l. More specifically, the outer electrodes 14a and 14b, which are divided into the outer electrode portions 15a to 15d, are formed by applying conductive paste made of Ag, Pd, Cu, Au, or an alloy of these metals as a principal component on the back surface of the ceramic green sheet, which becomes the insulating layer 16l, by screen printing, photolithography, etc. Alternatively, the step of forming the respective silver electrodes, which become the outer electrodes 14a and 14b, and the step of filling the via holes with the conductive paste may be performed in the same step.

Then, as shown in FIG. 13, the respective ceramic green sheets, which become the insulating layers 16a to 16l, are stacked and press-bonded in that order, and hence an unfired mother stack is obtained. Stacking and press-bonding of the respective ceramic green sheets, which become the insulating layers 16a to 16l, are performed such that a mother stack is obtained by stacking the ceramic green sheets one by one and temporarily press-bonding the ceramic green sheets, and then the unfired mother stack is finally press-bonded by pressing with a hydraulic press etc.

Then, the mother stack is cut into stacks 12 each having predetermined dimensions by a cutting blade. Accordingly, the unfired stack 12 is obtained.

Then, binder removing processing and firing are performed on the unfired stack 12. Binder removing processing is performed, for example, under conditions at 500° C. for 2 hours in low oxygen atmosphere. Firing is performed, for example, under conditions at temperatures from 800° C. to 900° C. for 2.5 hours.

Then, Ni/Sn plating is performed on the respective silver electrodes, which become the outer electrodes 14a and 14b.

Thus, the outer electrodes 14a and 14b are formed. With the above steps, the electronic component 10d as shown in FIG. 12 is completed.

With the electronic component 10d configured as described above, similarly to the electronic component 10a, the electronic component 10d can be prevented from being mounted on the circuit board 100 with inclination.

In the electronic component 10d, similar to the electronic component 10b, the thickness of part of the outer electrodes 14a and 14b may be smaller than the thickness of the other part of the outer electrodes 14a and 14b. In this case, the respective silver electrodes, which become the outer electrodes 14a and 14b, are formed by screen printing or the like so that the thickness of part of the respective silver electrodes, which become the outer electrodes 14a and 14b, is smaller than the thickness of the other part of the respective silver electrodes, which become the outer electrodes 14a and 14b.

The exemplary electronic components 10a to 10d are each embedded with the coil L as a circuit element. However, the circuit element in embodiments consistent with the present disclosure is not limited to a coil, and may be other element, such as a capacitor or a resistor.

As described above, an embodiment consistent with the present disclosure is useful for an electronic component, and a manufacturing method thereof, and is excellent in that mounting on a circuit board with inclination can be prevented.

That which is claimed is:

1. An electronic component capable of being mounted on a circuit board including a first land and a second land, the component comprising:
a body; and
a first outer electrode and a second outer electrode that are arranged in a predetermined direction on a mount surface of the body, and are connectable to the first land and the second land, respectively,
wherein, with the first outer electrode and the second outer electrode connected to the first land and the second land, a first contact surface of the first outer electrode to the first land and a second contact surface of the second outer electrode to the second land have a structure being symmetric about a line parallel to the predetermined direction and each of the first contact surface and the second contact surface is divided into a plurality of portions.

2. The electronic component according to claim 1, wherein the first contact surface and the second contact surface are each divided into the plurality of portions by respective grooves parallel to the predetermined direction.

3. The electronic component according to claim 1, wherein the first outer electrode and the second outer electrode are each divided into a plurality of portions.

4. The electronic component according to claim 2, wherein the first outer electrode and the second outer electrode are each divided into a plurality of portions.

5. The electronic component according to claim 1, wherein a thickness of part of the first outer electrode and the second outer electrode is smaller than a thickness of the another part of the first outer electrode and the second outer electrode to divide the first contact surface and the second contact surface into the respective plurality of portions.

6. The electronic component according to claim 2, wherein a thickness of part of the first outer electrode and the second outer electrode is smaller than a thickness of the other part of the first outer electrode and the second outer electrode to divide the first contact surface and the second contact surface into the respective plurality of portions.

7. The electronic component according to claim 1, wherein the first outer electrode and the second outer electrode are separate from each other.

8. A manufacturing method of the electronic component according to claim 1, the method comprising steps of:
stacking a plurality of insulating layers provided with respective inner conductors to obtain the body in which the inner conductors are exposed from the mount surface, a ratio of an area occupied by the inner conductors in part arranged between the plurality of portions of each of the first contact surface and the second contact surface being smaller than a ratio of an area occupied by the inner conductors in each of the first contact surface and the second contact surface; and
forming the first outer electrode and the second outer electrode by plating such that the inner conductors exposed from the mount surface are covered with the first outer electrode and the second outer electrode.

9. The manufacturing method of the electronic component according to claim 8, wherein, the inner conductors are not exposed from the part arranged between the plurality of portions of each of the first contact surface and the second contact surface.

10. A manufacturing method of the electronic component according to claim 1, the method comprising steps of:
preparing a plurality of insulating layers;
forming the first outer electrode and the second outer electrode on the insulating layers, the first outer electrode and the second outer electrode being formed such that a thickness of part of the first outer electrode and the second outer electrode is smaller than a thickness of the other part of the first outer electrode and the second outer electrode; and
forming the body by stacking the plurality of insulating layers.

11. A manufacturing method of the electronic component according to claim 1, the method comprising steps of:
preparing a plurality of insulating layers;
forming the first outer electrode and the second outer electrode on the insulating layers, the first outer electrode and the second outer electrode being formed such that the first outer electrode and the second outer electrode are each divided into a plurality of portions; and
forming the body by stacking the plurality of insulating layers.

12. The electronic component according to claim 1, wherein the plurality of portions included in the first contact surface and the second contact surface are connected to the first land and the second land, respectively.

13. The electronic component according to claim 1, wherein the plurality of portions included in the first contact surface and the second contact surface are connected, by soldering, to the first land and the second land, respectively.

14. The electronic component according to claim 1, wherein prior to mounting the electronic component on the circuit board, at least one of the plurality of portions is electrically floating.

* * * * *